United States Patent
McCowen

(10) Patent No.: US 9,331,603 B2
(45) Date of Patent: May 3, 2016

(54) ENERGY COLLECTION

(71) Applicant: Ion Power Group LLC, Navarre, FL (US)

(72) Inventor: Clint McCowen, Navarre, FL (US)

(73) Assignee: Ion Power Group, LLC, Navarre, FL (US)

( * ) Notice: Subject to any disclaimer, the term of this patent is extended or adjusted under 35 U.S.C. 154(b) by 34 days.

(21) Appl. No.: 14/454,308

(22) Filed: Aug. 7, 2014

(65) Prior Publication Data

US 2016/0043661 A1    Feb. 11, 2016

(51) Int. Cl.
| | |
|---|---|
| F02B 63/04 | (2006.01) |
| F03G 7/08 | (2006.01) |
| H02K 7/18 | (2006.01) |
| H02N 1/04 | (2006.01) |
| F03D 9/00 | (2006.01) |
| H02P 9/04 | (2006.01) |

(52) U.S. Cl.
CPC ...................................... *H02N 1/04* (2013.01)

(58) Field of Classification Search
USPC ....... 290/1 R, 44; 126/683; 307/149; 322/2 R
See application file for complete search history.

(56) References Cited

U.S. PATENT DOCUMENTS

| | | |
|---|---|---|
| 674,427 A | 5/1901 | Palencsar |
| 911,260 A | 2/1909 | Pennock |
| 1,014,719 A | 1/1912 | Pennock |
| 2,473,819 A | 6/1949 | Pittman |
| 3,532,959 A | 10/1970 | Erickson |
| 3,780,722 A | 12/1973 | Swet |
| 3,946,227 A | 3/1976 | Bingham |
| 4,079,225 A | 3/1978 | Warner |
| 4,092,250 A | 5/1978 | Sano et al. |
| 4,104,696 A | 8/1978 | Cochran, Jr. |
| 4,146,800 A | 3/1979 | Gregory et al. |
| 4,180,056 A | 12/1979 | Schnabel et al. |
| 4,201,197 A | 5/1980 | Dismer |
| 4,206,396 A | 6/1980 | Marks |
| 4,224,496 A | 9/1980 | Riordan et al. |
| 4,307,936 A | 12/1981 | Ochiai |
| 4,314,192 A | 2/1982 | Caro |
| 4,346,478 A | 8/1982 | Sichling |
| 4,425,905 A | 1/1984 | Mori |
| 4,433,248 A | 2/1984 | Marks |
| RE31,678 E | 9/1984 | Ochiai |
| 4,483,311 A | 11/1984 | Whitaker |

(Continued)

FOREIGN PATENT DOCUMENTS

| | | |
|---|---|---|
| CA | 2647385 | 9/2008 |
| CN | 200780006209.7 | 8/2008 |

(Continued)

OTHER PUBLICATIONS

U.S. Appl. No. 12/637,720, filed Dec. 14, 2009, McCowen

*Primary Examiner* — Pedro J Cuevas
(74) *Attorney, Agent, or Firm* — Benjamin A. Balser; Next IP Law Group

(57) ABSTRACT

An energy collection system may collect and use the energy generated by an electric field. Collection fibers are suspended from a support system. The support system is electrically connected to a load by a connecting wire. The collection fibers may be made of any conducting material, but graphene, carbon and graphite are preferred. Diodes may be used to restrict the backflow or loss of energy.

20 Claims, 16 Drawing Sheets

(56) References Cited

U.S. PATENT DOCUMENTS

| | | |
|---|---|---|
| 4,489,269 A | 12/1984 | Edling et al. |
| 4,512,335 A | 4/1985 | Mori |
| 4,653,223 A | 3/1987 | Mori |
| 4,653,472 A | 3/1987 | Mori |
| 4,676,226 A | 6/1987 | Mori |
| 4,809,675 A | 3/1989 | Mori |
| 4,852,454 A | 8/1989 | Batchelder |
| 4,943,125 A | 7/1990 | Laundre' et al. |
| 4,988,159 A | 1/1991 | Turner et al. |
| 5,047,892 A | 9/1991 | Sakata et al. |
| 5,114,101 A | 5/1992 | Stern et al. |
| 5,145,257 A | 9/1992 | Bryant et al. |
| 5,379,103 A | 1/1995 | Zigler |
| 5,851,309 A | 12/1998 | Kousa |
| 5,942,806 A | 8/1999 | Veliadis |
| 6,025,591 A | 2/2000 | Taylor et al. |
| 6,038,363 A | 3/2000 | Slater et al. |
| 6,116,544 A | 9/2000 | Forward et al. |
| 6,173,922 B1 | 1/2001 | Hoyt et al. |
| 6,226,440 B1 | 5/2001 | Lyons |
| 6,419,191 B1 | 7/2002 | Hoyt et al. |
| 6,425,391 B1 | 7/2002 | Davoren et al. |
| 6,550,639 B2 | 4/2003 | Brown et al. |
| 6,735,830 B1 | 5/2004 | Merciel |
| 6,765,212 B2 | 7/2004 | Faus et al. |
| 6,846,447 B2 | 1/2005 | Mbachu et al. |
| 6,853,447 B2 | 2/2005 | Goetz |
| 6,894,772 B2 | 5/2005 | Goetz et al. |
| 6,925,852 B2 | 8/2005 | Susko |
| 6,974,110 B2 | 12/2005 | Grandics |
| 7,109,597 B1 | 9/2006 | Bose |
| 7,128,867 B2 | 10/2006 | Mbachu et al. |
| 7,231,809 B2 | 6/2007 | Susko |
| 7,259,475 B2 | 8/2007 | Hong et al. |
| 7,439,712 B2 * | 10/2008 | McCowen ............... H02N 1/10 174/2 |
| 7,449,668 B2 | 11/2008 | Schutten et al. |
| 7,478,712 B2 * | 1/2009 | McCowen ........... H02N 11/002 174/2 |
| 7,532,819 B1 | 5/2009 | Triebes et al. |
| 7,592,783 B1 | 9/2009 | Jarvinen |
| 8,269,401 B1 | 9/2012 | Kim et al. |
| 8,519,596 B1 | 8/2013 | Kim et al. |
| 8,686,575 B2 * | 4/2014 | McCowen ............ H02N 11/002 290/1 R |
| 2002/0026933 A1 | 3/2002 | Gottlieb |
| 2002/0108892 A1 | 8/2002 | Goetz et al. |
| 2002/0109094 A1 | 8/2002 | Goetz et al. |
| 2002/0109835 A1 | 8/2002 | Goetz |
| 2003/0125630 A1 | 7/2003 | Furnish |
| 2003/0193319 A1 | 10/2003 | Wood et al. |
| 2004/0011925 A1 | 1/2004 | Grandics |
| 2004/0083793 A1 | 5/2004 | Susko |
| 2004/0094853 A1 | 5/2004 | Mbachu et al. |
| 2004/0160711 A1 | 8/2004 | Stumberger |
| 2004/0212945 A1 | 10/2004 | Sprenger et al. |
| 2005/0101024 A1 | 5/2005 | Mbachu et al. |
| 2005/0136311 A1 | 6/2005 | Ueda et al. |
| 2005/0270525 A1 | 12/2005 | Susko |
| 2007/0107765 A1 | 5/2007 | Schutten et al. |
| 2007/0195481 A1 | 8/2007 | McCowen |
| 2007/0218323 A1 | 9/2007 | Sudo et al. |
| 2007/0223171 A1 | 9/2007 | Guy et al. |
| 2007/0273206 A1 | 11/2007 | McCowen |
| 2007/0297892 A1 | 12/2007 | Kildegaard |
| 2008/0145714 A1 | 6/2008 | Kagami |
| 2009/0040680 A1 | 2/2009 | McCowen |
| 2009/0107842 A1 | 4/2009 | Park et al. |
| 2009/0114495 A1 | 5/2009 | McCowen |
| 2009/0216292 A1 | 8/2009 | Pless et al. |
| 2010/0090562 A1 | 4/2010 | Mccowen |
| 2011/0148248 A1 | 6/2011 | Landa |
| 2012/0043858 A1 | 2/2012 | Mahapatra |
| 2012/0299559 A1 | 11/2012 | McCowen |
| 2013/0049531 A1 | 2/2013 | Wang et al. |
| 2015/0001966 A1 * | 1/2015 | McCowen ............... H05F 7/00 307/149 |

FOREIGN PATENT DOCUMENTS

| | | |
|---|---|---|
| EP | 1999767 A2 | 12/2008 |
| JP | 5552236 | 5/2014 |
| RU | 2008137622 | 2/2007 |
| WO | 2007098341 | 8/2007 |

* cited by examiner

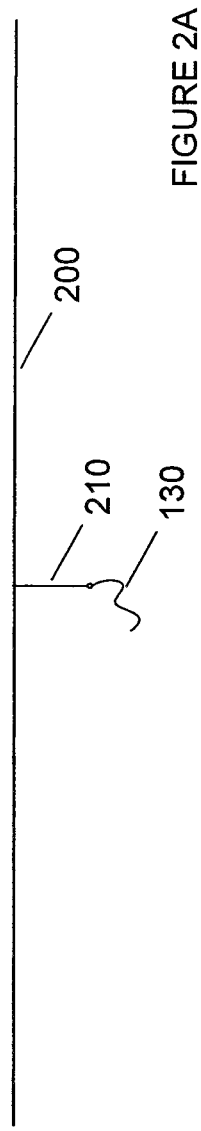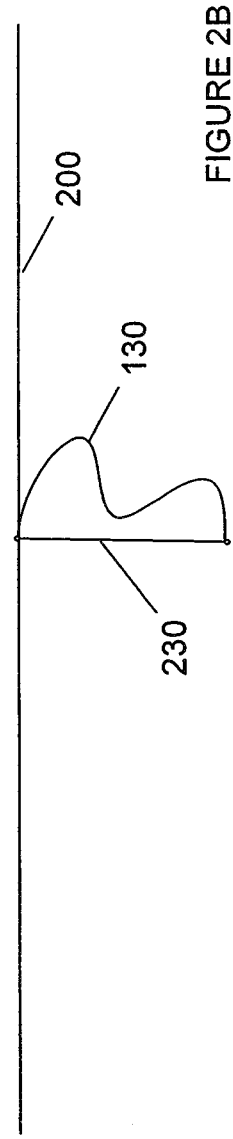

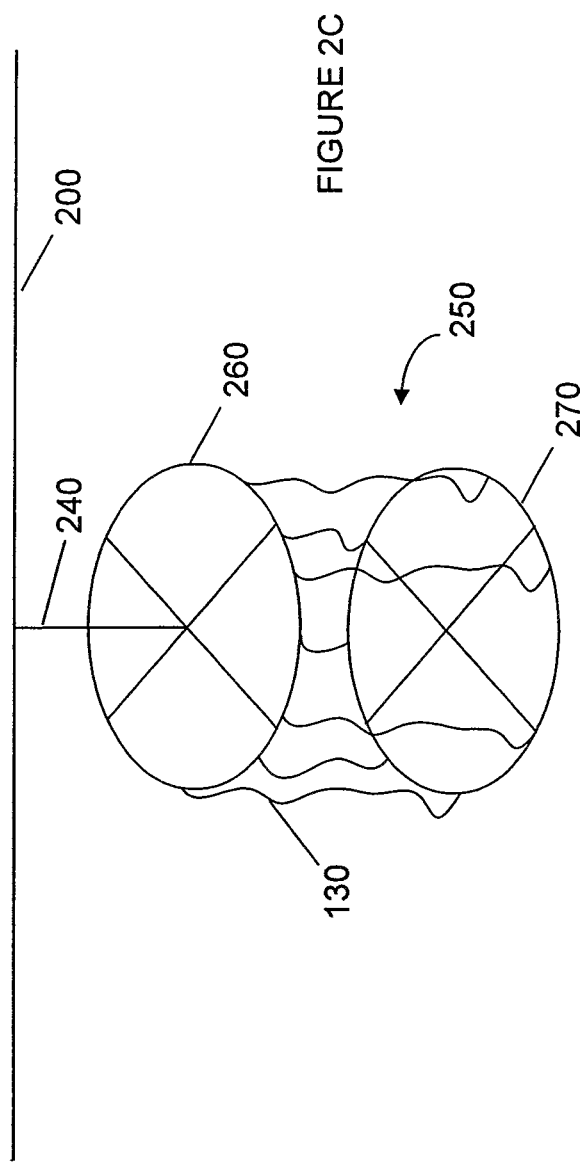

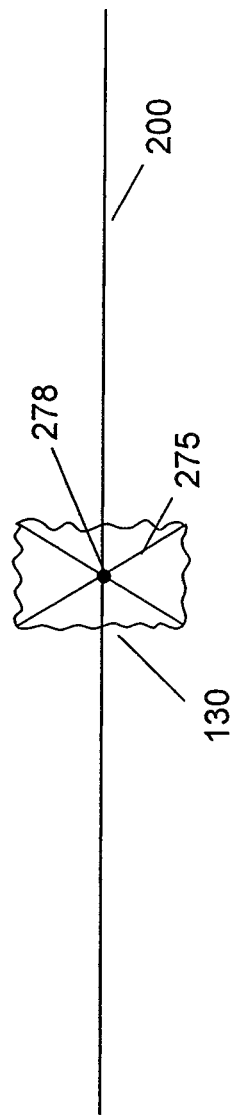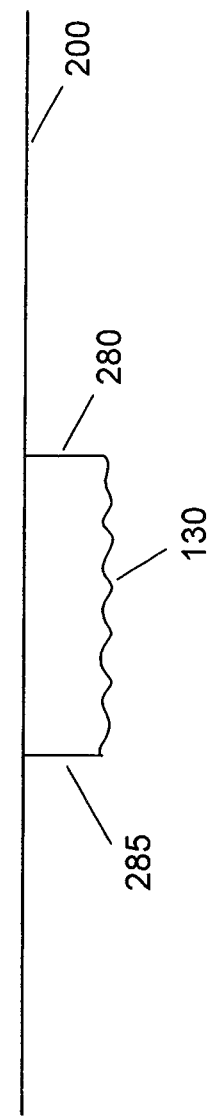

ENERGY COLLECTION

TECHNICAL FIELD

The present disclosure is generally related to energy and, more particularly, is related to systems and methods for collecting energy.

BACKGROUND

The concept of fair weather electricity deals with the electric field and the electric current in the atmosphere propagated by the conductivity of the air. Clear, calm air carries an electrical current, which is the return path for thousands of lightening storms simultaneously occurring at any given moment around the earth. For simplicity, this energy may be referred to as static electricity or static energy. FIG. 1 illustrates a weather circuit for returning the current from lightning, for example, back to ground 10. Weather currents 20, 30 return the cloud to ground current 40.

In a lightening storm, an electrical charge is built up, and electrons arc across a gas, ionizing it and producing the lightening flash. As one of ordinary skill in the art understands, the complete circuit requires a return path for the lightening flash. The atmosphere is the return path for the circuit. The electric field due to the atmospheric return path is relatively weak at any given point because the energy of thousands of electrical storms across the planet are diffused over the atmosphere of the entire Earth during both fair and stormy weather. Other contributing factors to electric current being present in the atmosphere may include cosmic rays penetrating and interacting with the earth's atmosphere, and also the migration of ions, as well as other effects yet to be fully studied.

Some of the ionization in the lower atmosphere is caused by airborne radioactive substances, primarily radon. In most places of the world, ions are formed at a rate of 5-10 pairs per cubic centimeter per second at sea level. With increasing altitude, cosmic radiation causes the ion production rate to increase. In areas with high radon exhalation from the soil (or building materials), the rate may be much higher.

Alpha-active materials are primarily responsible for the atmospheric ionization. Each alpha particle (for instance, from a decaying radon atom) will, over its range of some centimeters, create approximately 150,000-200,000 ion pairs.

While there is a large amount of usable energy available in the atmosphere, a method or apparatus for efficiently collecting that energy has not been forthcoming. Therefore, a heretofore unaddressed need exists in the industry to address the aforementioned deficiencies and inadequacies.

SUMMARY

Embodiments of the present disclosure provide systems and methods for collecting energy. Briefly described in architecture, one embodiment of the system, among others, can be implemented by a support structure, the support structure comprising at least one of an airplane, drone, blimp, balloon, kite, satellite, train, motorcycle, bike, skateboard, scooter, hovercraft, electronic device, electronic device case, billboard, cell tower, radio tower, camera tower, flag pole, telescopic pole, light pole, utility pole, water tower, building, sky scraper, coliseum, roof top, solar panel and a fixed or mobile structure exceeding 1 inch in height above ground or sea level; at least one collection device with, in operation, microscopic points of a cross-section of the collection device exposed to the environment electrically connected to the support structure; and a load electrically connected to the at least one collection device.

Embodiments of the present disclosure can also be viewed as providing methods for collecting energy. In this regard, one embodiment of such a method, among others, can be broadly summarized by the following steps: suspending at least one collection device with, in operation, microscopic points of a cross-section of the collection device exposed to the environment from a support structure, the at least one collection device electrically connected to the support structure, the support structure comprising at least one of an airplane, drone, blimp, balloon, kite, satellite, train, motorcycle, bike, skateboard, scooter, hovercraft, electronic device, electronic device case, billboard, cell tower, radio tower, camera tower, flag pole, telescopic pole, light pole, utility pole, water tower, building, sky scraper, coliseum, roof top, solar panel and a fixed or mobile structure exceeding 1 inch in height above ground or sea level; and providing a load with an electrical connection to the at least one collection device to draw current.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2A is a side view of an energy collection fiber suspended from a support wire.

FIG. 2B is a side view of an example embodiment of an energy collection fiber suspended from a support wire and with an additional support member.

FIG. 2C is a perspective view of a support structure for multiple energy collection fibers.

FIG. 2D is a side view of an example embodiment of a support structure for multiple energy collection fibers.

FIG. 2E is a side view of a support structure for an energy collection fiber.

DETAILED DESCRIPTION

Figure 1:
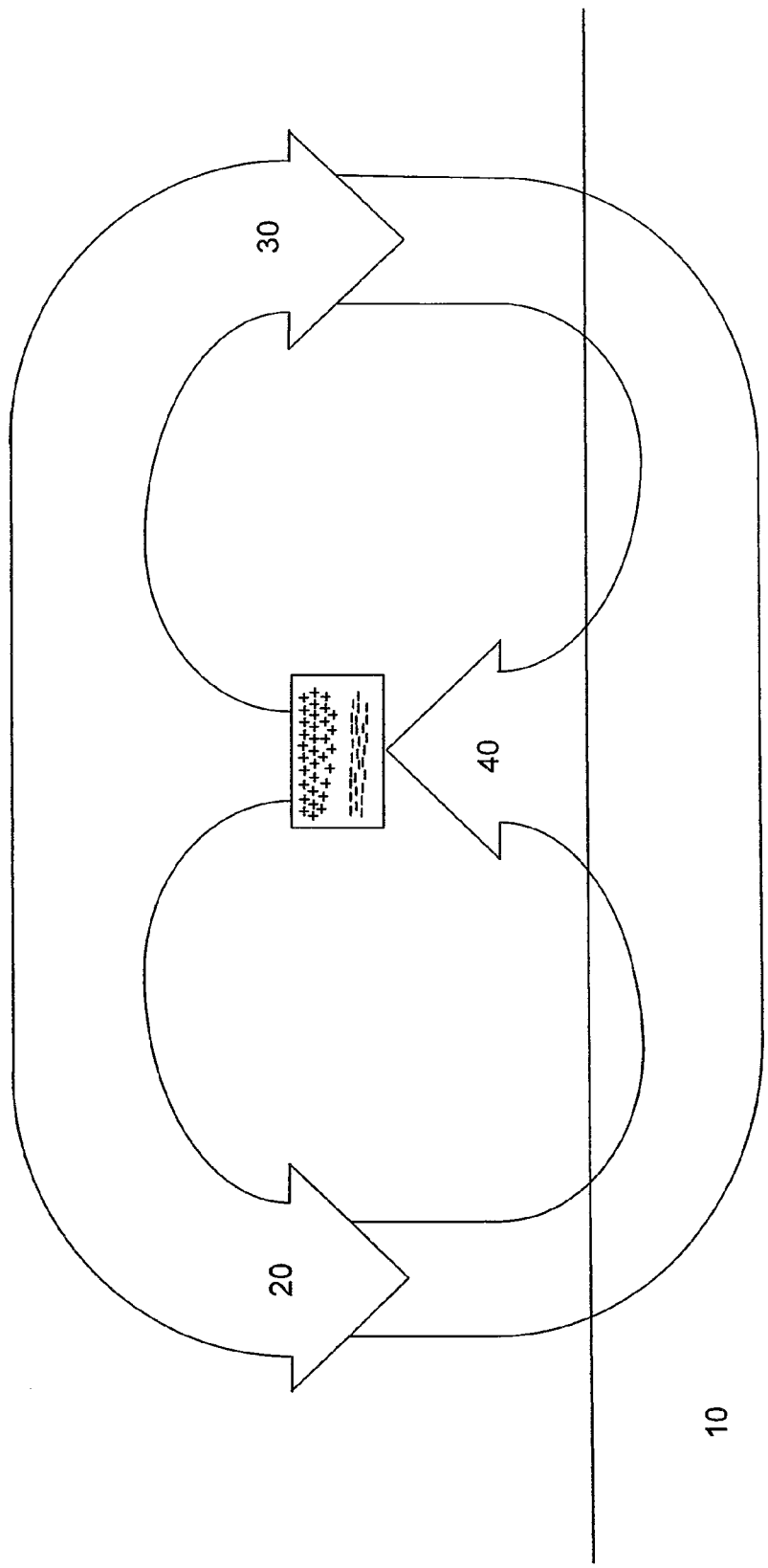
FIG. 1 is a circuit diagram of a weather energy circuit.

Electric charges on conductors reside entirely on the external surface of the conductors, and tend to concentrate more around sharp points and edges than on flat surfaces. Therefore, an electric field received by a sharp conductive point may be much stronger than a field received by the same charge residing on a large smooth conductive shell. An example embodiment of this disclosure takes advantage of this property, among others, to collect and use the energy generated by an electric field in the atmosphere. Referring to collection system 100 presented in FIG. 2, at least one collection device 130 may be suspended from a support wire system 120 supported by poles 110. Collection device 130 may comprise a diode or a collection fiber individually, or the combination of a diode and a collection fiber. Support wire system 120 may be electrically connected to load 150 by connecting wire 140. Supporting wire system 120 may be any shape or pattern. Also, conducting wire 140 may be one wire or multiple wires. The collection device 130 in the form of a fiber may comprise any conducting or non-conducting material, including carbon, graphite, Teflon, and metal. An example embodiment utilizes carbon or graphite fibers for static electricity collection. Support wire system 120 and connecting wire 140 can be made of any conducting material, including aluminum or steel, but most notably, copper. Teflon may be added to said conductor as well, such as non-limiting examples of a Teflon impregnated wire, a wire with a Teflon coating, or Teflon strips hanging from a wire. Conducting wire 120, 140, and 200 may be bare wire, or coated with insulation as a non-limiting example. Wires 120 and 140 are a means of transporting the energy collected by collection device 130.

An example embodiment of the collection fibers as collection device 130 includes graphite or carbon fibers. Graphite and carbon fibers, at a microscopic level, can have hundreds of thousands of points. Atmospheric electricity may be attracted to these points. If atmospheric electricity can follow two paths where one is a flat surface and the other is a pointy, conductive surface, the electrical charge will be attracted to the pointy, conductive surface. Generally, the more points that are present, the higher energy that can be gathered. Therefore, carbon, or graphite fibers are examples that demonstrate collection ability.

In at least one example embodiment, the height of support wire 120 may be an important factor. The higher that collection device 130 is from ground, the larger the voltage potential between collection device 130 and electrical ground. The electric field may be more than 100 volts per meter under some conditions. When support wire 120 is suspended in the air at a particular altitude, wire 120 will itself collect a very small charge from ambient voltage. When collection device 130 is connected to support wire 120, collection device 130 becomes energized and transfers the energy to support wire 120.

Figure 2:
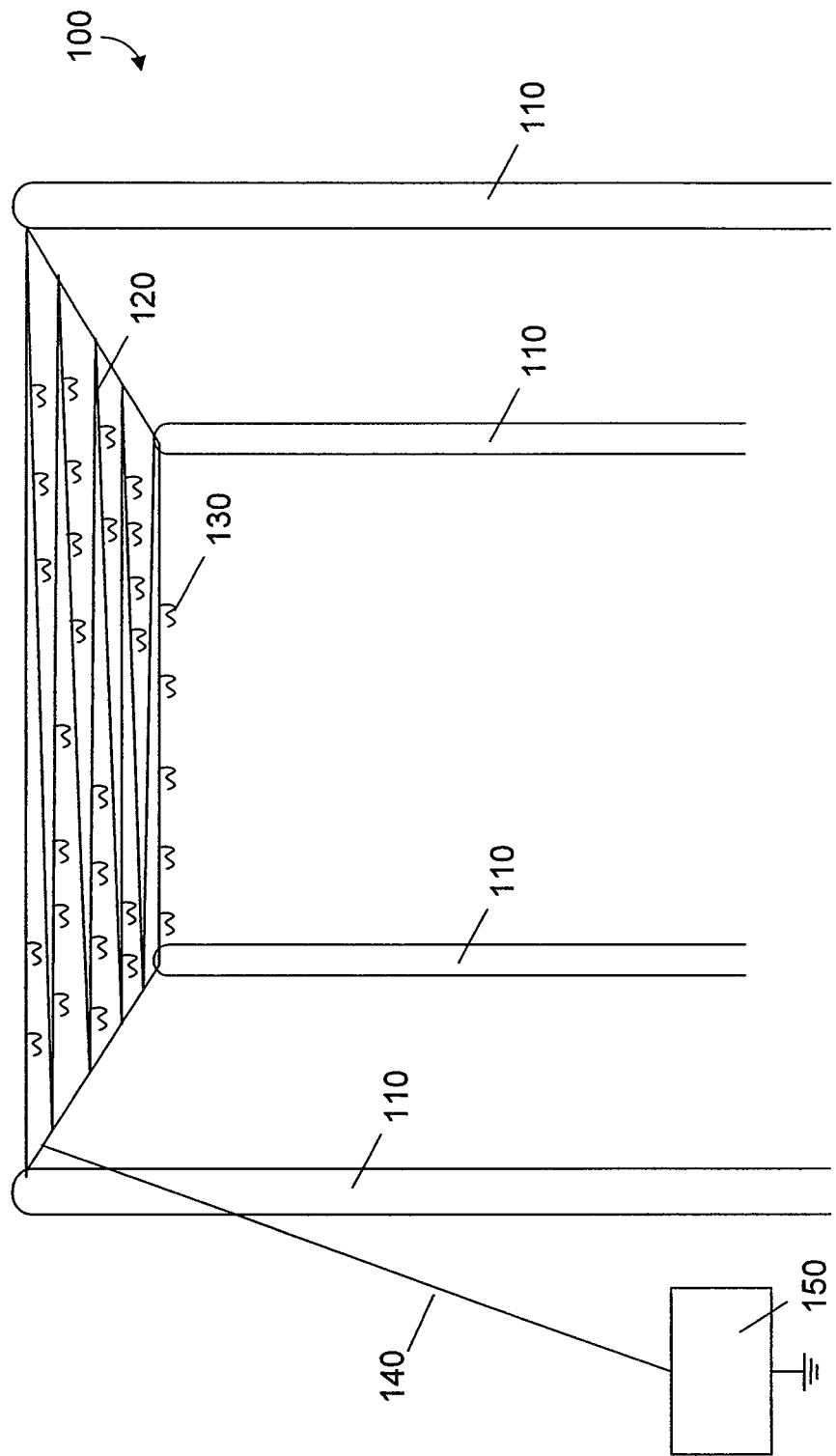
FIG. 2 is a perspective view of an example embodiment of many energy collectors elevated above ground by a structure.

A diode, not shown in FIG. 2, may be connected in several positions in collection system 100. A diode is a component that restricts the direction of movement of charge carriers. It allows an electric current to flow in one direction, but essentially blocks it in the opposite direction. A diode can be thought of as the electrical version of a check valve. The diode may be used to prevent the collected energy from discharging into the atmosphere through the collection fiber embodiment of collection device 130. An example embodiment of the collection device comprises the diode with no collection fiber. A preferred embodiment, however, includes a diode at the connection point of a collection fiber to support system 120 such that the diode is elevated above ground. Multiple diodes may be used between collection device 130 and load 150. Additionally, in an embodiment with multiple fibers, the diodes restricts energy that may be collected through one fiber from escaping through another fiber.

Collection device 130 may be connected and arranged in relation to support wire system 120 by many means. Some non-limiting examples are provided in FIGS. 2A-2G using a collection fiber embodiment. FIG. 2A presents support wire 200 with connecting member 210 for collection device 130. Connection member 210 may be any conducting material allowing for the flow of electricity from connection device 130 to support wire 200. Then, as shown in FIG. 2, the support wire 200 of support system 120 may be electrically connected through conducting wire 140 to load 150. A plurality of diodes may be placed at any position on the support structure wire. A preferred embodiment places a diode at an elevated position at the connection point between a collection fiber embodiment of collection device 130 and connection member 210.

Likewise, FIG. 2B shows collection fiber 130 electrically connected to support wire 200 and also connected to support member 230. Support member 230 may be connected to collection fiber 130 on either side. Support member 230 holds the fiber steady on both ends instead of letting it move freely. Support member 230 may be conducting or non-conducting. A plurality of diodes may be placed at any position on the support structure wire. A preferred embodiment places a diode at elevated position at the connection point between collection fiber 130 and support wire 200 or between fiber 130, support member 230, and support wire 200.

FIG. 2C presents multiple collection fibers in a squirrel cage arrangement with top and bottom support members. Support structure 250 may be connected to support structure wire 200 by support member 240. Structure 250 has a top 260 and a bottom 270 and each of the multiple collection fibers 130 are connected on one end to top 260 and on the other end to bottom 270. A plurality of diodes may be placed at any position on support structure 250. A preferred embodiment places a diode at an elevated position at the connection point between collection fiber 130 and support structure wire 200.

FIG. 2D presents another example embodiment of a support structure with support members 275 in an x-shape connected to support structure wire 200 at intersection 278 with collection fibers 130 connected between ends of support members 275. A plurality of diodes may be placed at any position on the support structure. A preferred embodiment places a diode at an elevated position at the connection point between collection fiber 130 and support wire 200.

FIG. 2E provides another example embodiment for supporting collection fiber 130. Collection fiber 130 may be connected on one side to support member 285, which may be connected to support structure wire 200 in a first location and on the other side to support member 280, which may be connected to support structure wire 200 in a second location on support structure wire 200. The first and second locations may be the same location, or they may be different locations, even on different support wires. A plurality of diodes may be placed at any position on the support structure. A preferred embodiment places one or more diodes at elevated positions at the connection point(s) between collection fiber 130 and support wire 200.

Figure 2F:
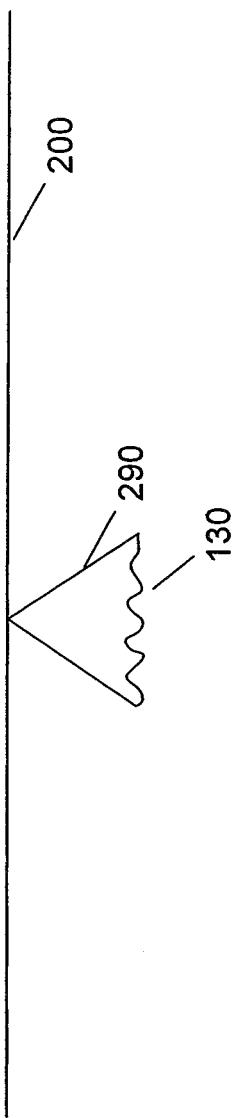
FIG. 2F is a side view of an example embodiment of a support structure for an energy collection fiber.

FIG. 2F presents another example embodiment of a support for a collection fiber. Two support members 290 may support either side of a collection fiber and are connected to support wire 200 in a single point. A plurality of diodes may be placed at any position on the support structure. A preferred embodiment places a diode at an elevated position at the connection point between collection fiber 130 and support wire 200.

Figure 2G:
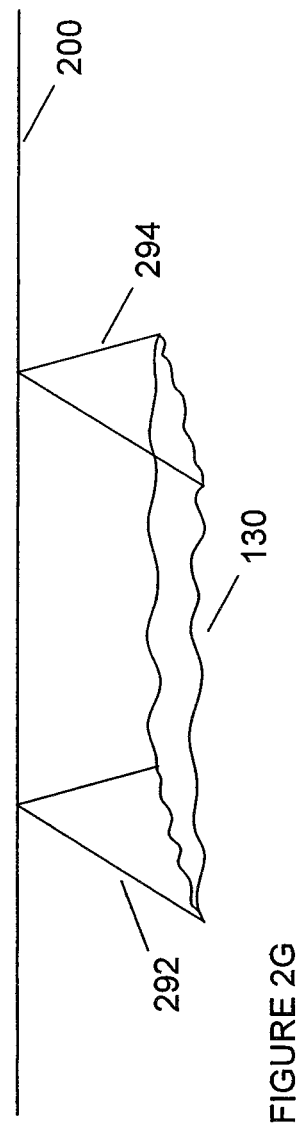
FIG. 2G is a side view of a support structure for multiple energy collection fibers.

FIG. 2G provides two supports as provided in FIG. 2F such that at least two support members 292, 294 may be connected to support structure wire 200 in multiple locations and collection fibers 130 may be connected between each end of the support structures. Collection fibers 130 may be connected between each end of a single support structure and between multiple support structures. A plurality of diodes may be placed at any position on the support structure. A preferred embodiment places one or more diodes at elevated positions at the connection point(s) between collection fiber 130 and support structure wire 200.

Figure 3:
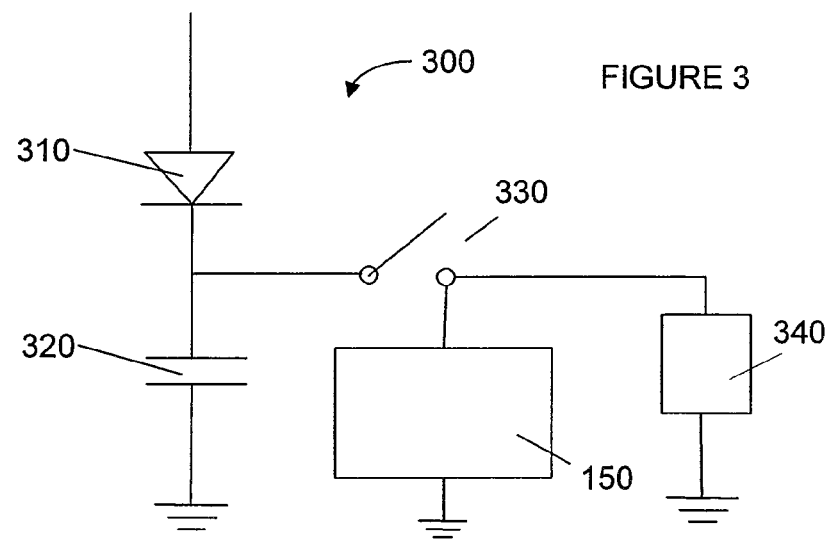
FIG. 3 is a circuit diagram of an example embodiment of a circuit for the collection of energy.

FIG. 3 provides a schematic diagram of storing circuit 300 for storing energy collected by one or more collection devices (130 from FIG. 2). Load 150 induces current flow. Diode 310 may be electrically connected in series between one or more collection devices (130 from FIG. 2) and load 150. A plurality of diodes may be placed at any position in the circuit. Switch 330 may be electrically connected between load 150 and at least one collection device (130 from FIG. 2) to connect and disconnect the load. Capacitor 320 maybe connected in parallel to the switch 330 and load 150 to store energy when switch 330 is open for delivery to load 150 when switch 330 is closed. Rectifier 340 may be electrically connected in parallel to load 150, between the receiving end of switch 330 and ground. Rectifier 340 may be a full-wave or a half-wave rectifier. Rectifier 340 may include a diode electrically connected in parallel to load 150, between the receiving end of switch 330 and ground. The direction of the diode of rectifier 340 is optional.

Figure 4:
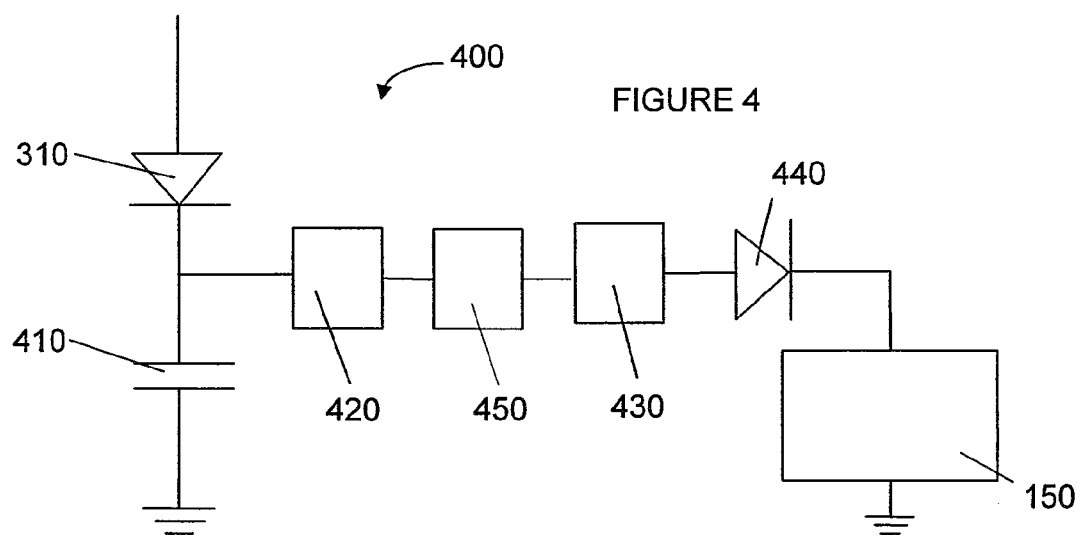
FIG. 4 is a circuit diagram of an example embodiment of a circuit for the collection of energy.

In an example embodiment provided in FIG. 4, storage circuit 400 stores energy from one or more collection devices (130 from FIG. 2) by charging capacitor 410. If charging capacitor 410 is not used, then the connection to ground shown at capacitor 410 is eliminated. A plurality of diodes may be placed at any position in the circuit. Diode 310 may be electrically connected in series between one or more collection devices (130 from FIG. 2) and load 150. Diode 440 may be placed in series with load 150. The voltage from capacitor 410 can be used to charge spark gap 420 when it reaches sufficient voltage. Spark gap 420 may comprise one or more spark gaps in parallel. Non-limiting examples of spark gap 420 include mercury-reed switches and mercury-wetted reed switches. When spark gap 420 arcs, energy will arc from one end of the spark gap 420 to the receiving end of the spark gap 420. The output of spark gap 420 may be electrically connected in series to rectifier 450. Rectifier 450 may be a full-wave or a half-wave rectifier. Rectifier 450 may include a diode electrically connected in parallel to transformer 430 and load 150, between the receiving end of spark gap 420 and ground. The direction of the diode of rectifier 450 is optional. The output of rectifier 450 is connected to transformer 430 to drive load 150.

Figure 5:
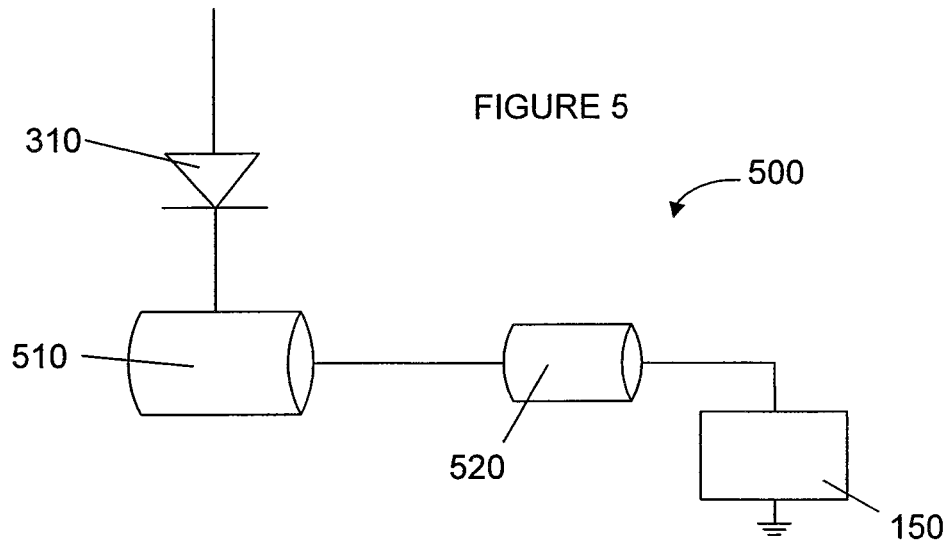
FIG. 5 is a circuit diagram of an example embodiment of an energy collection circuit for powering a generator and motor.

FIG. 5 presents motor driver circuit 500. One or more collection devices (130 from FIG. 2) are electrically connected to static electricity motor 510, which powers generator 520 to drive load 150. A plurality of diodes may be placed at any position in the circuit. Motor 510 may also be directly connected to load 150 to drive it directly.

Figure 6:
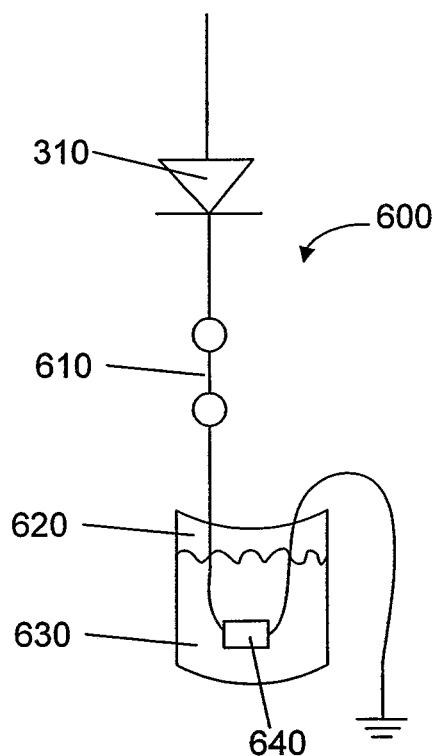
FIG. 6 is a circuit diagram of an example embodiment of a circuit for collecting energy and using it for the production of hydrogen and oxygen.

FIG. 6 demonstrates a circuit 600 for producing hydrogen. A plurality of diodes maybe placed at any position in the circuit. One or more collection devices (130 from FIG. 2) are electrically connected to primary spark gap 610, which may be connected to secondary spark gap 640. Non-limiting examples of spark gaps 610, 640 include mercury-reed switches and mercury-wetted reed switches. Secondary spark gap 640 may be immersed in water 630 within container 620. When secondary spark gap 640 immersed in water 630 is energized, spark gap 640 may produce bubbles of hydrogen and oxygen, which may be collected to be used as fuel.

Figure 7:
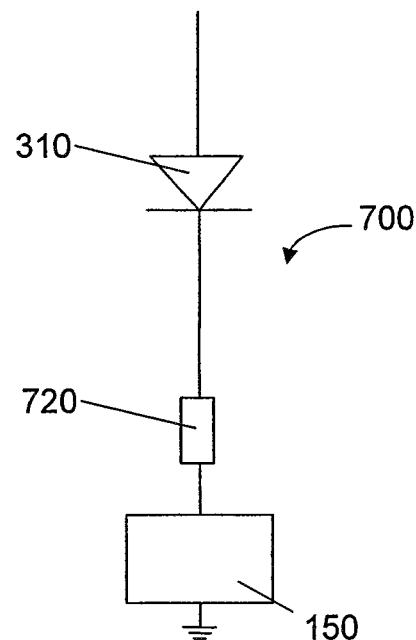
FIG. 7 is a circuit diagram of an example embodiment of a circuit for collecting energy, and using it for driving a fuel cell.

FIG. 7 presents circuit 700 for driving a fuel cell. A plurality of diodes may be placed at any position in the circuit. Collection devices (130 from FIG. 2) provide energy to fuel cell 720 which drives load 150. Fuel cell 720 may produce hydrogen and oxygen.

Figure 8:
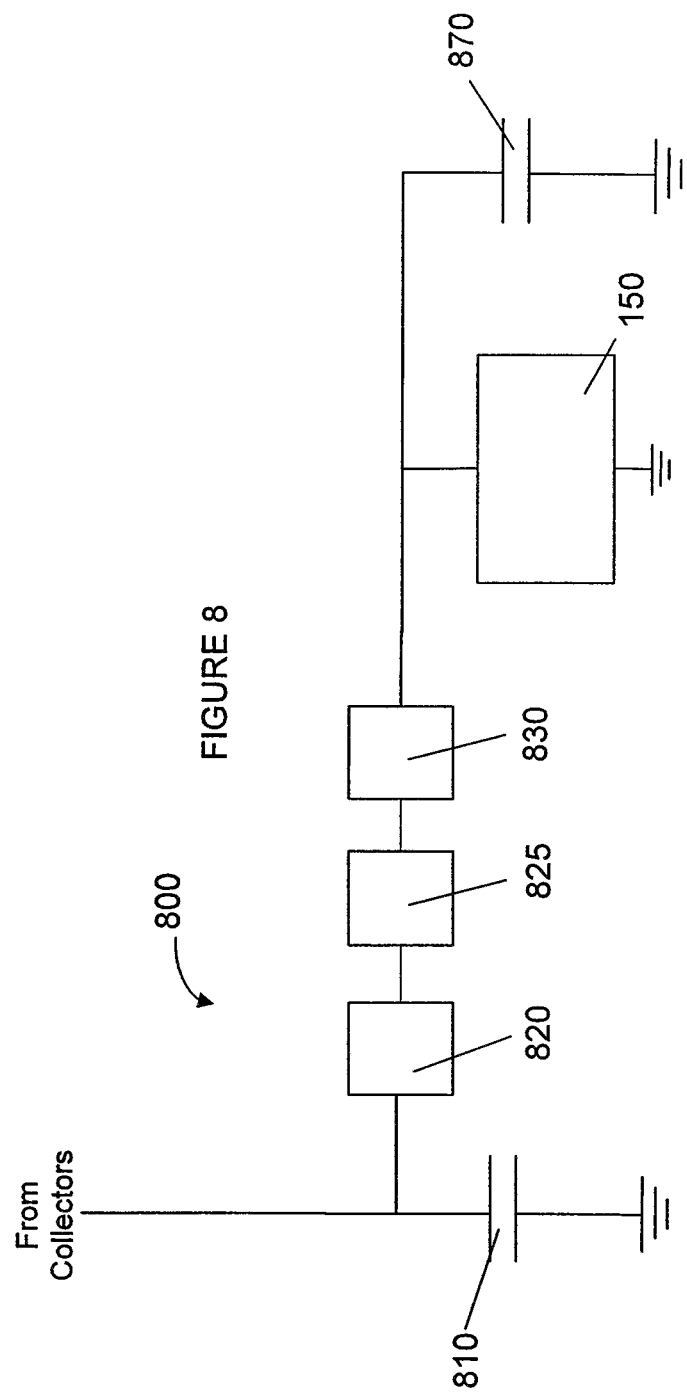
FIG. 8 is a circuit diagram of an example embodiment of a circuit for collecting energy.

FIG. 8 presents example circuit 800 for the collection of energy. Storage circuit 800 stores energy from one or more collection devices (130 from FIG. 2) by charging capacitor 810. If charging capacitor 810 is not used, then the connection to ground shown at capacitor 810 is eliminated. A plurality of diodes may be placed at any position in the circuit. The voltage from capacitor 810 can be used to charge spark gap 820 when it reaches sufficient voltage. Spark gap 820 may comprise one or more spark gaps in parallel or in series. Non-limiting examples of spark gap 820 include mercury-reed switches and mercury-wetted reed switches. When spark gap 820 arcs, energy will arc from one end of spark gap 820 to the receiving end of spark gap 820. The output of spark gap 820 may be electrically connected in series to rectifier 825. Rectifier 825 may be a full-wave or a half-wave rectifier. Rectifier 825 may include a diode electrically connected in parallel to inductor 830 and load 150, between the receiving end of spark gap 820 and ground. The direction of the diode of rectifier 825 is optional. The output of rectifier 825 is connected to inductor 830. Inductor 830 may be a fixed value inductor or a variable inductor. Capacitor 870 may be placed in parallel with load 150.

Figure 9:
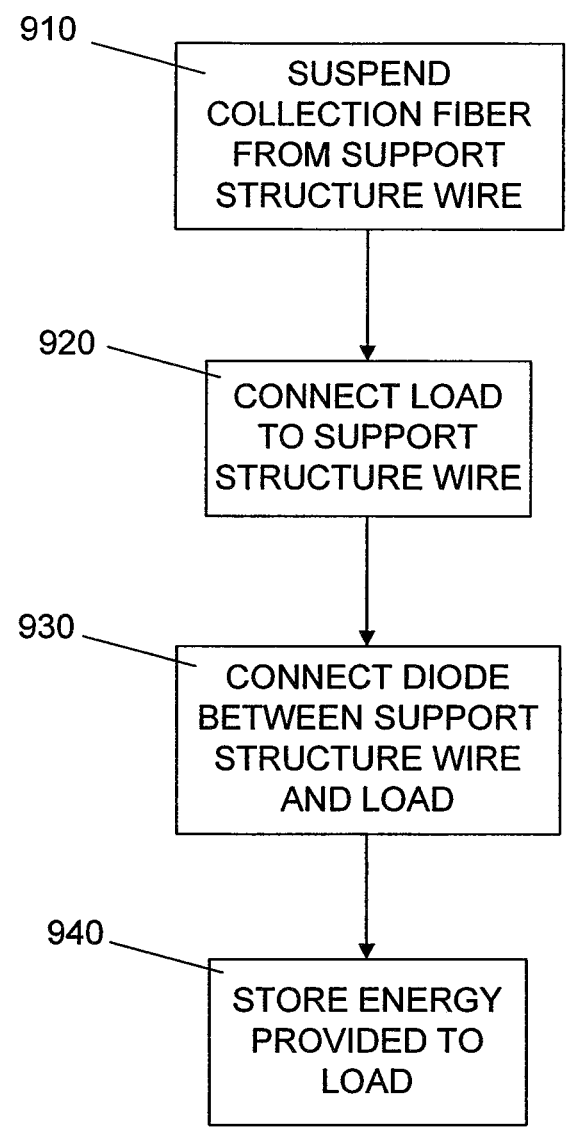
FIG. 9 is a flow diagram of an example embodiment of collecting energy with a collection fiber.

FIG. 9 presents a flow diagram of a method for collecting energy. In block 910, one or more collection devices may be suspended from a support structure wire. In block 920, a load may be electrically connected to the support structure wire to draw current. In block 930 a diode may be electrically connected between the support structure wire and the electrical connection to the load. In block 940, energy provided to the load may be stored or otherwise utilized.

Figure 10:
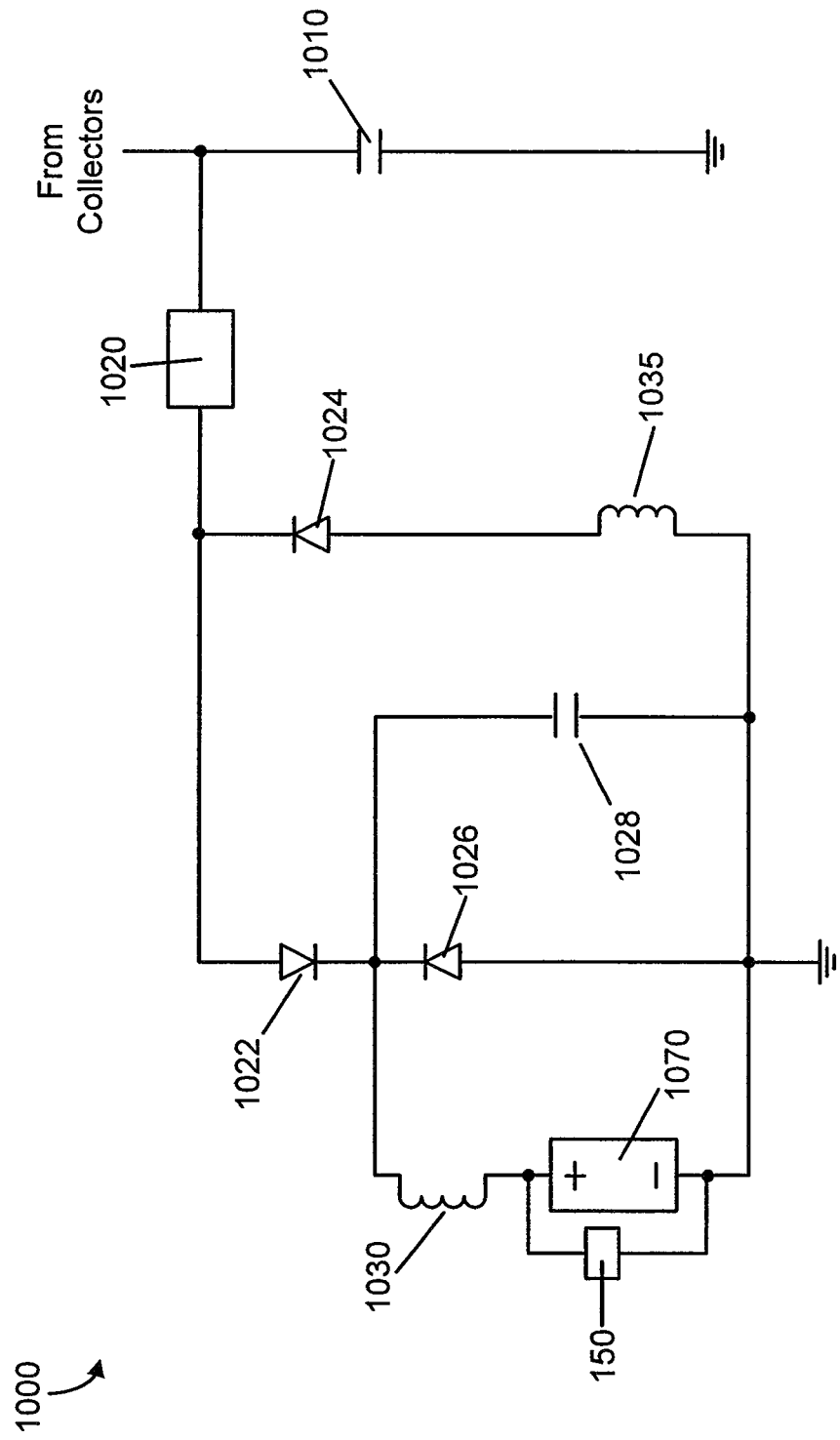
FIG. 10 is a circuit diagram of an example embodiment of a circuit for collecting energy from a dual polarity source.

FIG. 10 presents circuit 1000 as an example embodiment for the collection of energy from a dual polarity source. This may be used, for example, to collect atmospheric energy that reverses in polarity compared with the ground. Such polarity reversal has been discovered as occurring occasionally on Earth during, for example, thunderstorms and bad weather, but has also been observed during good weather. Such polarity reversal may occur on other planetary bodies, including Mars and Venus, as well. Energy polarity on other planets, in deep space, or on other heavenly bodies, may be predominantly negative or predominantly positive. Collector fibers (130 from FIG. 2), which may comprise graphene, silicene, and/or other like materials, are capable of collecting positive energy and/or negative energy, and circuit 1000 is capable of processing positive and/or negative energy, providing an output which is always positive. Circuit 1000 may collect energy from one or more collection devices (130 from FIG. 2). Charging capacitor 1010 may be used to store a charge until the voltage at spark gap 1020 achieves the spark voltage. Capacitor 1010 is optional.

A plurality of diodes may be placed in a plurality of positions in circuit 1000. The voltage from capacitor 1010 may be used to charge spark gap 1020 to a sufficient voltage. Spark gap 1020 may comprise one or more spark gaps in parallel or in series. Non-limiting examples of spark gap 1020 include mercury-reed switches, mercury-wetted reed switches, open-gap spark gaps, and electronic switches. When spark gap 1020 arcs, energy will arc from an emitting end of spark gap 1020 to a receiving end of spark gap 1020. The output of spark gap 1020 is electrically connected to the anode of diode 1022 and the cathode of diode 1024. The cathode of diode 1022 is electrically connected to the cathode of diode 1026 and inductor 1030. Inductor 1030 may be a fixed value inductor or a variable inductor. The anode of diode 1026 is electrically connected to ground. Capacitor 1028 is electrically connected between ground and the junction of the cathodes of diode 1022 and diode 1026. Inductor 1035 is electrically connected between ground and the anode of diode 1024. Inductor 1035 may be a fixed value inductor or a variable inductor. Capacitor 1070, the anode of diode 1026, inductor 1035, and load 1050 are electrically connected to ground. Capacitor 1070 may be placed in parallel with load 150.

Figure 11:
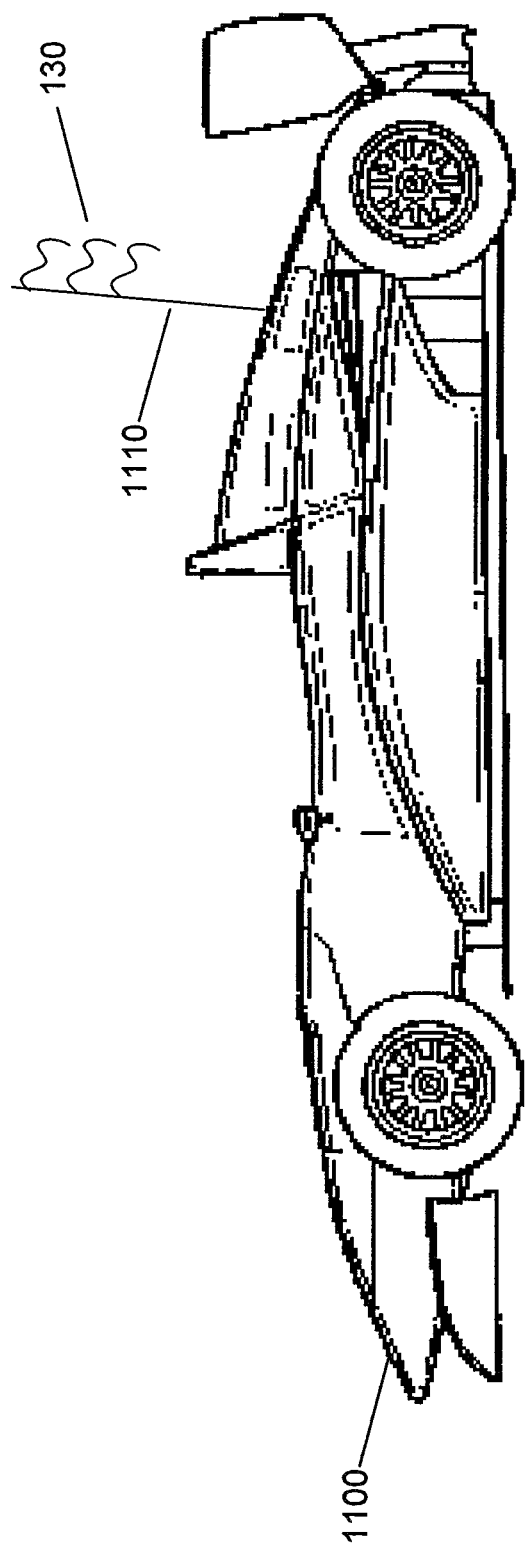
FIG. 11 is a system diagram of an example embodiment of an energy collection system connected to an automobile vehicle.
Figure 12:
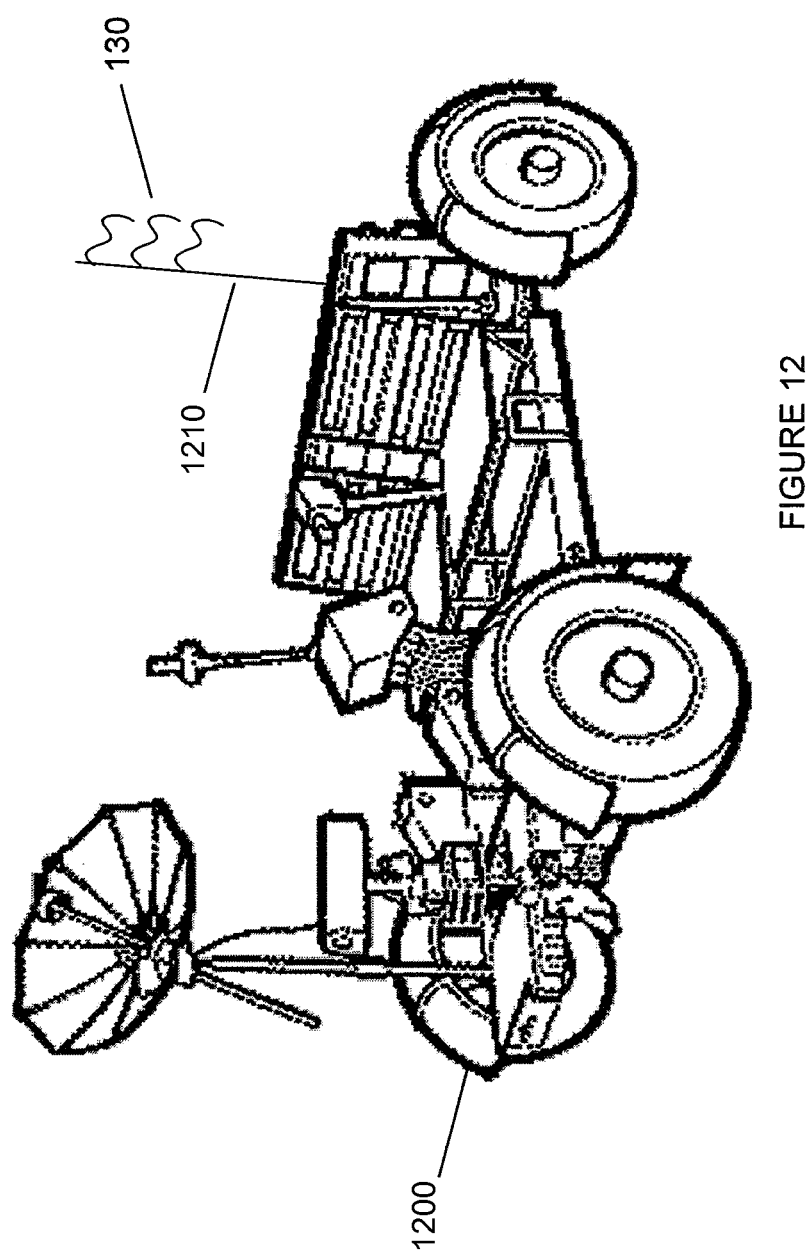
FIG. 12 is a system diagram of an example embodiment of an energy collection system connected to a lunar rover vehicle.

FIGS. 11 and 12 provide example embodiments of vehicle 1110, which utilizes electricity, the vehicle employing systems of energy collection provided herein. Vehicle 1100 in FIG. 11 is shown as an automobile vehicle, but could be any means of locomotion that utilizes electricity, including a car, a train, a motorcycle, a boat, an airplane, robotic rovers, space craft, etc. Vehicle 1200 in FIG. 12 is shown as a lunar rover vehicle. In FIGS. 11 and 12, support rod 1110, 1210 is electrically connected to an electrical system in vehicle 1100, 1200. Energy collectors 130, which may comprise graphene, silicene, and/or other like materials, are electrically connected to support rod 1110, 1210 and may be used to supply energy to electrical circuits within the vehicle. A non-limiting use includes a top-off charge for a battery system, on-board hydrogen production, and/or assisting in the same. Energy collectors 130 may be used to augment the efficiency of the locomotion that utilizes electrical energy as well.

Figure 13:
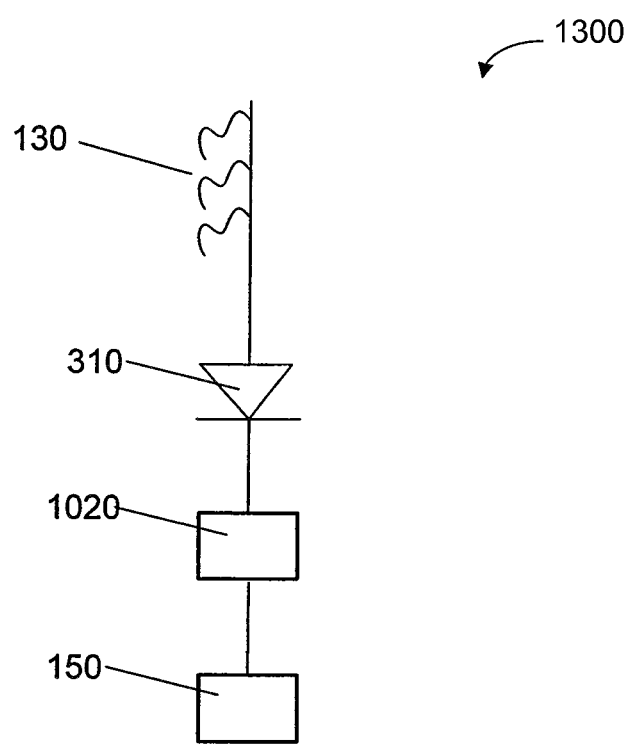
FIG. 13 is a system diagram of an example embodiment of an energy collection system comprising collection devices with a diode.

FIG. 13 provides an example embodiment of energy collection system 1200 in which diode 310 is used to isolate collection devices 130 from spark gap 1020 and load 150. Collection devices 130 may comprise graphite, carbon fibers, carbon/carbon fibers, graphene, silicene, and/or other like materials, or a mixture thereof.

Figure 14:
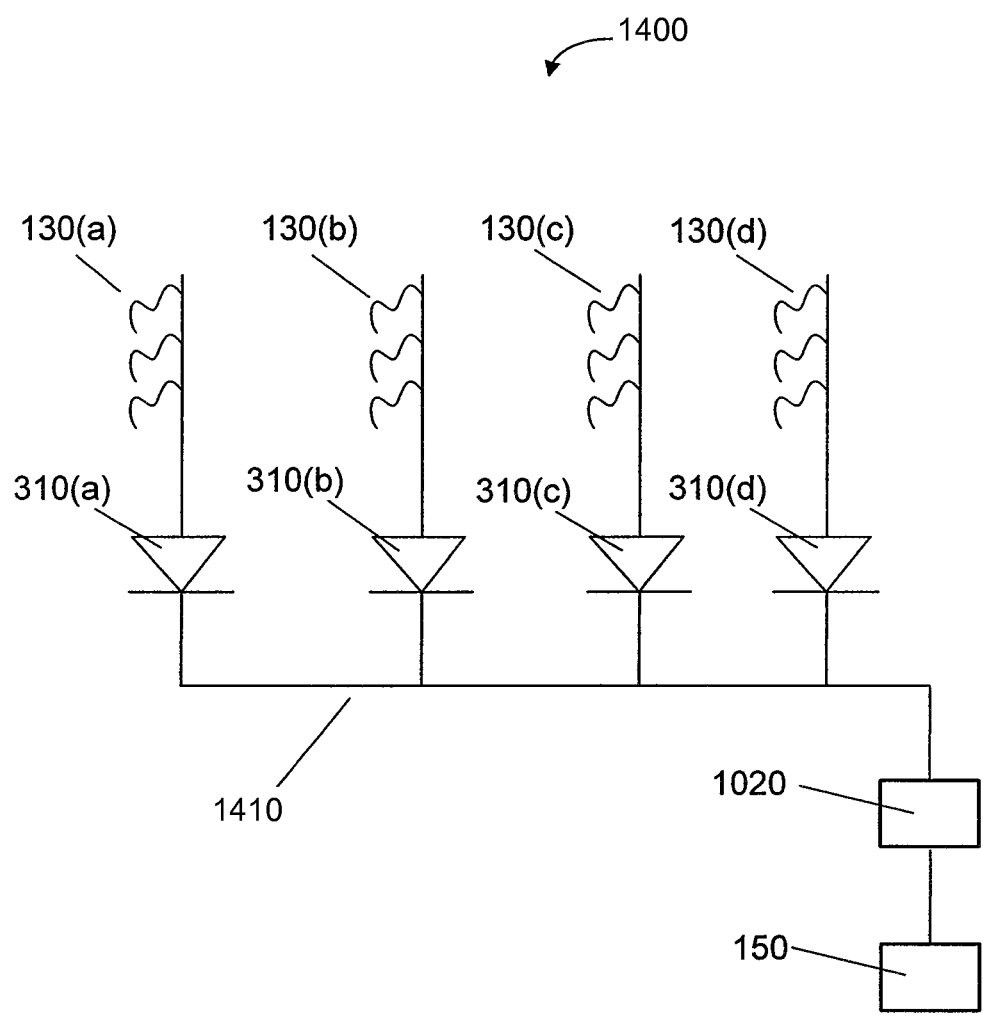
FIG. 14 is a system diagram of an example embodiment of an energy collection system comprising multiple legs of the system of FIG. 13.

FIG. 14 provides an example embodiment of energy collection system 1400 in which a plurality of energy collection systems, such as that provided in FIG. 13, are combined. Each leg consisting of collection devices 130, which may comprise graphene, silicene, and/or other like materials, and diode 310 are connected in parallel with other legs, each leg electrically connected to trunk wire 1410. The legs could also be connected serially. Trunk wire 1410 is electrically connected to a collection circuit, which may comprise load 150 and spark gap 1020 in any configuration that has been previously discussed. Each leg may comprise one or more collection devices 130 and at least one diode electrically connected between the collection devices and the collection circuit. Although three collection devices 130 are shown on each leg, any number of collection devices may be used. Although four legs are shown, any number of legs may be used.

Figure 15:
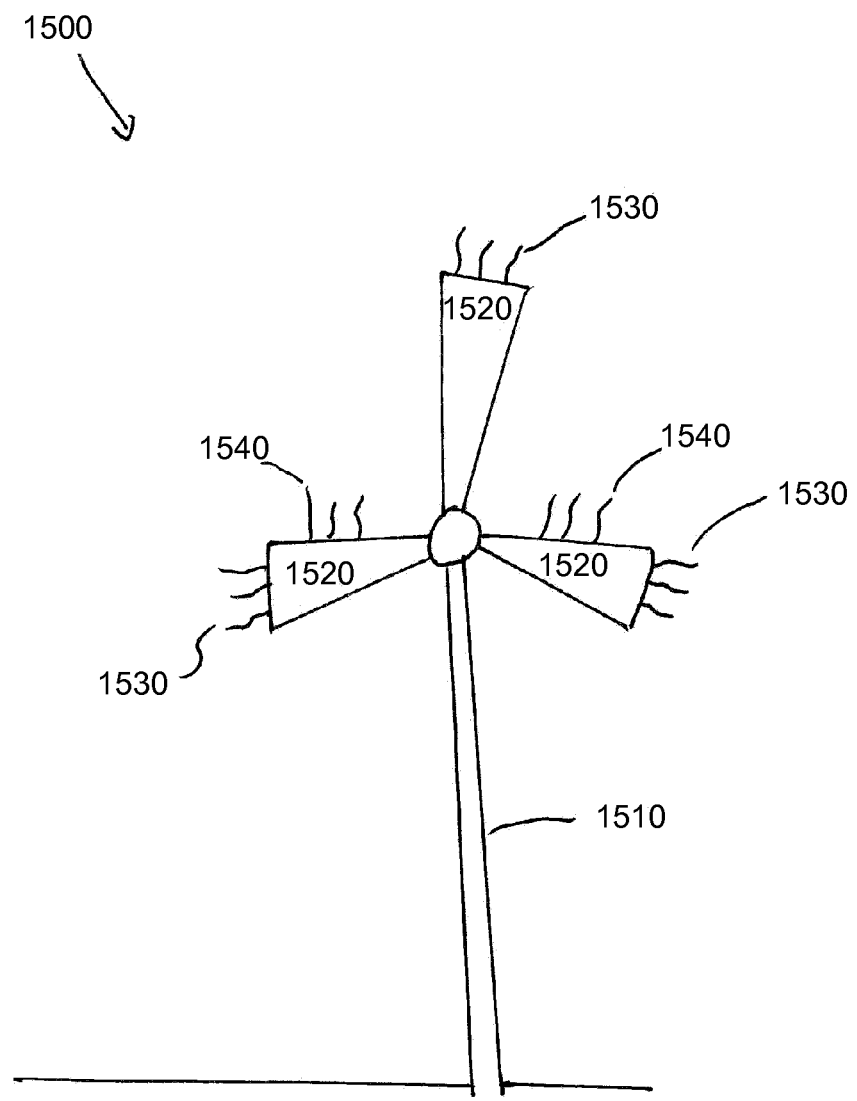
FIG. 15 is a system diagram of an example embodiment of a windmill with energy collectors.

FIG. 15 presents a system diagram of an example embodiment of a windmill with energy collectors, which may comprise graphene, silicene, and/or other like materials in an example embodiment. A windmill is an engine powered by the energy of wind to produce alternative forms of energy. They may, for example, be implemented as small tower mounted wind engines used to pump water on farms. The modern wind power machines used for generating electricity are more properly called wind turbines. Common applications of windmills are grain milling, water pumping, threshing, and saw mills. Over the ages, windmills have evolved into more sophisticated and efficient wind-powered water pumps and electric power generators. In an example embodiment, as provided in FIG. 10, windmill tower 1500 of suitable height and/or propeller 1520 of windmill tower 1500 may be equipped with energy collecting fibers 1530, 1540, which may comprise graphene, silicene, and/or other like materials in an example embodiment. Collecting fibers 1530, 1540 may turn windmill 1500 into a power producing asset even when there is not enough wind to turn propellers 1520. During periods when there is enough wind to turn propellers 1520, collecting fibers 1530, 1540 may supplement/boost the amount of energy the windmill produces.

A windmill is an engine powered by the energy of wind to produce alternative forms of energy. They may, for example, be implemented as small tower mounted wind engines used to pump water on farms. The modern wind power machines used for generating electricity are more properly called wind turbines. Common applications of windmills are grain milling, water pumping, threshing, and saw mills. Over the ages, windmills have evolved into more sophisticated and efficient wind-powered water pumps and electric power generators. In an example embodiment, as provided in FIG. 10, windmill tower 1000 of suitable height and/or propeller 1020 of windmill tower 1000 may be equipped with energy collecting fibers 1030, 1040. Collecting fibers 1030, 1040 may turn windmill 1000 into a power producing asset even when there is not enough wind to turn propellers 1020. During periods when there is enough wind to turn propellers 1020, collecting fibers 1030, 1040 may supplement/boost the amount of energy the windmill produces.

Windmill 1500, properly equipped with ion collectors 1530, 1540, such as a non-limiting example of fibers with graphene, silicene, and/or other like materials, can produce electricity: 1) by virtue of providing altitude to the fiber to harvest ions, and 2) while the propeller is turning, by virtue of wind blowing over the fiber producing electricity, among other reasons, via the triboelectric effect (however, it is also possible for the triboelectric effect to occur, producing electricity, in winds too weak to turn the propeller).

There are at least two ways that energy collectors may be employed on or in a windmill propeller to harvest energy. Propellers 1520 may be equipped with energy collectors

1530, 1540 attached to, or supported by, propeller 1520 with wires (or metal embedded in, or on propeller 1520) electrically connecting energy collectors 1530, 1540, which may comprise graphene, silicene, and/or other like materials, to a load or power conversion circuit. There may be a requirement to electrically isolate energy collectors 1530, 1540, which are added to propeller 1520, from electrical ground, so that the energy collected does not short to ground through propeller 1520 itself or through support tower 1510, but rather is conveyed to the load or power conversion circuit. Energy collectors may be connected to the end of propellers 1520 such as collectors 1530. Alternatively, energy collectors may be connected to the sides of propellers 1520 such as collectors 1540.

Alternatively, propeller 1520 may be constructed of carbon fiber or other suitable material, with wires (or the structural metal supporting propeller 1520 may be used) electrically connecting to a load or power conversion circuit. In the case of propeller 1520 itself being constructed of carbon fiber, for example, the fiber may be 'rough finished' in selected areas so that the fiber is "fuzzy." For example, small portions of it may protrude into the air as a means of enhancing collection efficiency. The fuzzy parts of collectors 1530, 1540 may do much of the collecting. There may be a requirement to electrically isolate carbon fiber propeller 1520 from electrical ground, so that the energy it collects does not short to ground through metal support tower 1510, but rather is conveyed to the load or power conversion circuit. Diodes may be implemented within the circuit to prevent the backflow of energy, although diodes may not be necessary in some applications.

In an alternative embodiment, windmill 1500 may be used as a base on which to secure an even higher extension tower to support the energy collectors and/or horizontal supports extending out from tower 1510 to support the energy collectors. Electrical energy may be generated via ion collection due to altitude and also when a breeze or wind blows over the collectors supported by tower 1510.

In alternative embodiments to windmill 1500, other non-limiting example support structures include airplanes, drones, blimps, balloons, kites, satellites, cars, boats, trucks, (including automobile and other transportation conveyance tires), trains, motorcycles, bikes, skateboards, scooters, hovercraft (automobiles and conveyance of any kind), billboards, cell towers, radio towers, camera towers, flag poles, towers of any kind including telescopic, light poles, utility poles, water towers, buildings, sky scrapers, coliseums, roof tops, solar panel and all fixed or mobile structures exceeding 1 inch in height above ground or sea level.

An example embodiment of a support structure may also include cell phones and other electronic devices and their cases, including cases containing rechargeable batteries. For example, someone may set her cell phone or other electronic device or battery pack on the window ledge of a tall apartment building to help charge it. Other example support structures may include space stations, moon and Mars structures, rockets, planetary rovers and drones including robots and artificial intelligence entities.

Under some conditions, ambient voltage may be found to be 180-400 volts at around 6 ft, with low current. With the new generation of low current devices being developed, a hat containing ion harvesting material may provide enough charge, or supplemental charge, collected over time to help power low current devices such as future cell phones, tracking devices, GPS, audio devices, smart glasses, etc. Clothes may also be included as examples of support structures. Friction of the ion collection material (such as non-limiting examples of carbon, graphite, silicene and graphene) against unlike materials, such as wool, polyester, cotton, etc (used in clothes) may cause a voltage to be generated when rubbed together. Additionally, wind passing over the ion collection material has been demonstrated to generate voltage, even at low altitude. In an additional example embodiment, embedding collection devices into automobile tires (for example, in a particular pattern) could generate collectible voltage.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A method of collecting energy comprising:
   suspending at least one collection device with, in operation, microscopic points of a cross-section of the collection device exposed to the environment from a support structure, the at least one collection device electrically connected to the support structure, the support structure comprising at least one of an airplane, drone, blimp, balloon, kite, satellite, train, motorcycle, bike, skateboard, scooter, hovercraft, electronic device, electronic device case, billboard, cell tower, radio tower, camera tower, flag pole, telescopic pole, light pole, utility pole, water tower, building, sky scraper, coliseum, roof top, solar panel and a fixed or mobile structure exceeding 1 inch in height above ground or sea level; and
   providing a load with an electrical connection to the at least one collection device to draw current.

2. The method of claim 1, wherein the collection device collects energy by triboelectric effect.

3. The method of claim 1, wherein the collection device comprises a collection fiber.

4. The method of claim 1, wherein the collection device comprises a diode and a collection fiber and the diode is electrically connected between the collection fiber and the load.

5. The method of claim 1, further comprising storing energy provided to the load.

6. The method of claim 5, wherein storing energy provided to the load comprises storing energy in a capacitor or an inductor.

7. The method of claim 3, wherein the collection fiber comprises at least one of carbon, graphite, silicene and graphene.

8. A system of energy collection comprising:
   a support structure, the support structure comprising at least one of an airplane, drone, blimp, balloon, kite, satellite, train, motorcycle, bike, skateboard, scooter, hovercraft, electronic device, electronic device case, billboard, cell tower, radio tower, camera tower, flag pole, telescopic pole, light pole, utility pole, water tower, building, sky scraper, coliseum, roof top, solar panel and a fixed or mobile structure exceeding 1 inch in height above ground or sea level;

at least one collection device with, in operation, microscopic points of a cross-section of the collection device exposed to the environment electrically connected to the support structure; and a load electrically connected to the at least one collection device.

9. The system of claim 8, wherein the collection device collects energy by triboelectric effect.

10. The system of claim 8, wherein the collection device comprises a collection fiber.

11. The system of claim 8, wherein the collection device comprises a collection fiber and a diode electrically connected between the load and the collection fiber.

12. The system of claim 11, wherein the diode is elevated relative to the ground level.

13. The system of claim 10, wherein the collection fiber comprises at least one of carbon, graphite, silicene, or graphene.

14. The system of claim 8, further comprising a diode electrically connected between the at least one collection device and the support structure.

15. The system of claim 8, further comprising: a switch connected in series between the at least one collection device and the load; and a capacitor connected in parallel with the switch and the load.

16. The system of claim 15, wherein the switch comprises an interrupter connected between the load and at least one collection device, and wherein the interrupter comprises at least one of a fluorescent tube, a neon bulb, an AC light, and a spark gap.

17. The system of claim 8, further comprising: a motor for providing power, the motor connected between the at least one collection device and the load; and a generator powered by the motor.

18. The system of claim 8, further comprising a fuel cell between the support structure and the load.

19. The system of claim 18, wherein the fuel cell produces hydrogen and oxygen.

20. A system of collecting energy comprising:

means for suspending at least one collection device with, in operation, microscopic points of a cross-section of the collection device exposed to the environment, the at least one collection device electrically connected to the means for suspending, the means for suspending comprising at least one of an airplane, drone, blimp, balloon, kite, satellite, train, motorcycle, bike, skateboard, scooter, hovercraft, electronic device, electronic device case, billboard, cell tower, radio tower, camera tower, flag pole, telescopic pole, light pole, utility pole, water tower, building, sky scraper, coliseum, roof top, solar panel and a fixed or mobile structure exceeding 1 inch in height above ground or sea level;

means for inducing current flow, the means for inducing current flow electrically connected to the means for suspending; and means for restricting the backflow of charge carriers, the means for restricting the backflow of charge carriers electrically connected between the at least one collection device and the means for inducing current flow.

* * * * *